(12) United States Patent
Dubey

(10) Patent No.: US 11,516,083 B2
(45) Date of Patent: Nov. 29, 2022

(54) SYSTEMS, COMPUTER-READABLE MEDIA AND COMPUTER-IMPLEMENTED METHODS FOR AUTOMATED, DYNAMIC CAPACITY PLANNING USING HTTP RESPONSE HEADER FIELDS

(71) Applicant: Mastercard International Incorporated, Purchase, NY (US)

(72) Inventor: Sumit K. Dubey, Maryland Heights, MO (US)

(73) Assignee: Mastercard International Incorporated, Purchase, NY (US)

(*) Notice: Subject to any disclaimer, the term of this patent is extended or adjusted under 35 U.S.C. 154(b) by 176 days.

(21) Appl. No.: 16/571,447

(22) Filed: Sep. 16, 2019

(65) Prior Publication Data

US 2020/0106672 A1 Apr. 2, 2020

Related U.S. Application Data

(60) Provisional application No. 62/738,192, filed on Sep. 28, 2018.

(51) Int. Cl.
*H04L 67/02* (2022.01)
*H04L 41/08* (2022.01)
*G06F 16/23* (2019.01)
*H04L 41/082* (2022.01)
*G06F 40/205* (2020.01)
*G06F 17/11* (2006.01)

(52) U.S. Cl.
CPC ...... *H04L 41/0886* (2013.01); *G06F 16/2379* (2019.01); *G06F 40/205* (2020.01); *H04L 41/082* (2013.01); *H04L 67/02* (2013.01); *G06F 17/11* (2013.01)

(58) Field of Classification Search
CPC ... H04L 41/0886; H04L 41/082; H04L 67/02; G06F 40/205; G06F 16/2379; G06F 17/11; G06F 16/9574
See application file for complete search history.

(56) References Cited

U.S. PATENT DOCUMENTS 6,157,942 A * 12/2000 Chu ................. H04L 61/1523
  709/203
6,233,606 B1 * 5/2001 Dujari ................ G06F 16/9574
  709/213

(Continued)

*Primary Examiner* — Vivek Srivastava
*Assistant Examiner* — Wuji Chen
(74) *Attorney, Agent, or Firm* — Hovey Williams LLP

(57) ABSTRACT

A system, computer-readable media and computer-implemented method for automated, dynamic capacity planning using HTTP response header fields. The computer-implemented method includes: automatically determining a server workload statistic relating to operation of a server, the server being configured to serve a content item in response to HTTP-formatted requests; automatically determining an expiration value based at least in part on the workload server statistic; automatically updating a configuration file corresponding to the content item with the expiration value; receiving a request for the content item from a requesting device; automatically accessing the configuration file and generating a HTTP-formatted response header incorporating the expiration value; and, automatically transmitting the HTTP-formatted response header and the content item in response to the request.

16 Claims, 3 Drawing Sheets

(56) References Cited

U.S. PATENT DOCUMENTS

| | | | | |
|---|---|---|---|---|
| 6,553,409 B1* | 4/2003 | Zhang | G06F 12/0815 | 711/147 |
| 7,062,570 B2* | 6/2006 | Hong | H04L 63/12 | 370/386 |
| 8,224,964 B1* | 7/2012 | Fredrickson | H04L 67/32 | 709/227 |
| 8,510,807 B1* | 8/2013 | Elazary | H04L 43/10 | 709/224 |
| 8,639,753 B1* | 1/2014 | Meadows | H04L 65/605 | 709/223 |
| 10,460,004 B1* | 10/2019 | Yanacek | G06F 16/9574 | |
| 11,196,728 B1* | 12/2021 | Fu | H04L 67/146 | |
| 11,218,784 B1* | 1/2022 | Mekuria | H04N 21/84 | |
| 2003/0182357 A1* | 9/2003 | Chess | G06F 16/9574 | 709/230 |
| 2003/0187917 A1* | 10/2003 | Cohen | H04L 67/1095 | 709/203 |
| 2003/0233328 A1* | 12/2003 | Scott | H04L 67/1029 | 705/50 |
| 2004/0049579 A1* | 3/2004 | Ims | H04L 69/329 | 709/225 |
| 2004/0255048 A1* | 12/2004 | Lev Ran | H04L 67/06 | 709/201 |
| 2007/0226613 A1* | 9/2007 | Tandriono | G06F 9/451 | 719/314 |
| 2007/0245409 A1* | 10/2007 | Harris | H04L 69/10 | 726/5 |
| 2008/0228864 A1* | 9/2008 | Plamondon | G06F 16/9574 | 709/203 |
| 2008/0228938 A1* | 9/2008 | Plamondon | H04L 67/02 | 709/233 |
| 2008/0299969 A1* | 12/2008 | Shatsky | H04W 60/06 | 455/435.1 |
| 2009/0235325 A1* | 9/2009 | Dimitrakos | G06F 11/0715 | 726/1 |
| 2009/0248871 A1* | 10/2009 | Takase | H04L 47/10 | 709/226 |
| 2010/0100604 A1* | 4/2010 | Fujiwara | G06F 12/0866 | 709/213 |
| 2010/0223322 A1* | 9/2010 | Mott | H04L 67/02 | 709/203 |
| 2011/0066676 A1* | 3/2011 | Kleyzit | H04L 67/289 | 709/203 |
| 2011/0137973 A1* | 6/2011 | Wei | H04L 67/28 | 709/202 |
| 2014/0278671 A1* | 9/2014 | Leonhardt | G06Q 10/1095 | 705/7.19 |
| 2014/0293875 A1* | 10/2014 | Ramakrishnan | H04L 67/2842 | 370/328 |
| 2015/0215359 A1* | 7/2015 | Bao | H04L 65/605 | 709/219 |
| 2019/0007928 A1* | 1/2019 | Di Girolamo | H04W 4/70 | |
| 2019/0132412 A1* | 5/2019 | Chen | H04L 67/16 | |
| 2020/0099685 A1* | 3/2020 | Wijaya | H04L 67/22 | |
| 2021/0021563 A1* | 1/2021 | Hegde | H04L 67/2852 | |

* cited by examiner

SYSTEMS, COMPUTER-READABLE MEDIA AND COMPUTER-IMPLEMENTED METHODS FOR AUTOMATED, DYNAMIC CAPACITY PLANNING USING HTTP RESPONSE HEADER FIELDS

RELATED APPLICATIONS

This application claims priority to U.S. Provisional Application No. 62/738,192, filed Sep. 28, 2018, which is incorporated herein by reference in its entirety

FIELD OF THE INVENTION

The present disclosure generally relates to systems, computer-readable media and computer-implemented methods for automated, dynamic capacity planning using HTTP header response fields.

BACKGROUND

Capacity planning for a web service typically comprises modeling and forecasting workload, followed by adjusting elements of a web service system in view of the system's response to the anticipated workload. For example, capacity planning for the system may begin by identifying hardware and software resources, network connectivity, network protocols, peak usage periods, management structures and otherwise generating a systematic description of the environment of the system. The systematic description may be developed via meetings, audits, questionnaires, interviews and other techniques.

Workload and performance models may be developed based at least in part on the systematic description, predicting how anticipated user requests will be distributed and impact performance of the system. The performance model may predict performance of individual system resources under various anticipated load scenarios, and weaknesses may be addressed by bolstering corresponding resources of the system.

BRIEF SUMMARY

In a first aspect, a system for automated, dynamic capacity planning using HTTP header response fields may be provided. The system may comprise a web server. The web server may include a communication element, a memory element, and a processing element which executes a software application. The software application may include instructions to: (1) automatically determine a server workload statistic relating to operation of a server, the server being configured to serve a content item in response to HTTP-formatted requests; (2) automatically determine an expiration value based at least in part on the workload server statistic; (3) automatically update a configuration file corresponding to the content item with the expiration value; (4) receive a request for the content item from a requesting device; (5) automatically access the configuration file and generate a HTTP-formatted response header incorporating the expiration value; and (6) automatically transmit the HTTP-formatted response header and the content item in response to the request. The system may include additional, less, or alternate functionality, including that discussed elsewhere herein.

In another aspect, a computer-implemented method for automated, dynamic capacity planning using HTTP header response fields may be provided. The computer-implemented method may include: automatically determining a server workload statistic relating to operation of a server, the server being configured to serve a content item in response to HTTP-formatted requests; automatically determining an expiration value based at least in part on the workload server statistic; automatically updating a configuration file corresponding to the content item with the expiration value; receiving a request for the content item from a requesting device; automatically accessing the configuration file and generating a HTTP-formatted response header incorporating the expiration value; and, automatically transmitting the HTTP-formatted response header and the content item in response to the request. The method may include additional, less, or alternate actions, including those discussed elsewhere herein.

In still another aspect, a system comprising computer-readable media for automated, dynamic capacity planning using HTTP header response fields may be provided. The system may include a non-transitory computer-readable medium with a program stored thereon, wherein the program instructs a hardware processing element of a web server to: (1) automatically determine a server workload statistic relating to operation of a server, the server being configured to serve a content item in response to HTTP-formatted requests; (2) automatically determine an expiration value based at least in part on the workload server statistic; (3) automatically update a configuration file corresponding to the content item with the expiration value; (4) receive a request for the content item from a requesting device; (5) automatically access the configuration file and generate a HTTP-formatted response header incorporating the expiration value; and (6) automatically transmit the HTTP-formatted response header and the content item in response to the request. The program(s) stored on the computer-readable media may instruct the processing elements to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

DETAILED DESCRIPTION

Figure 1:
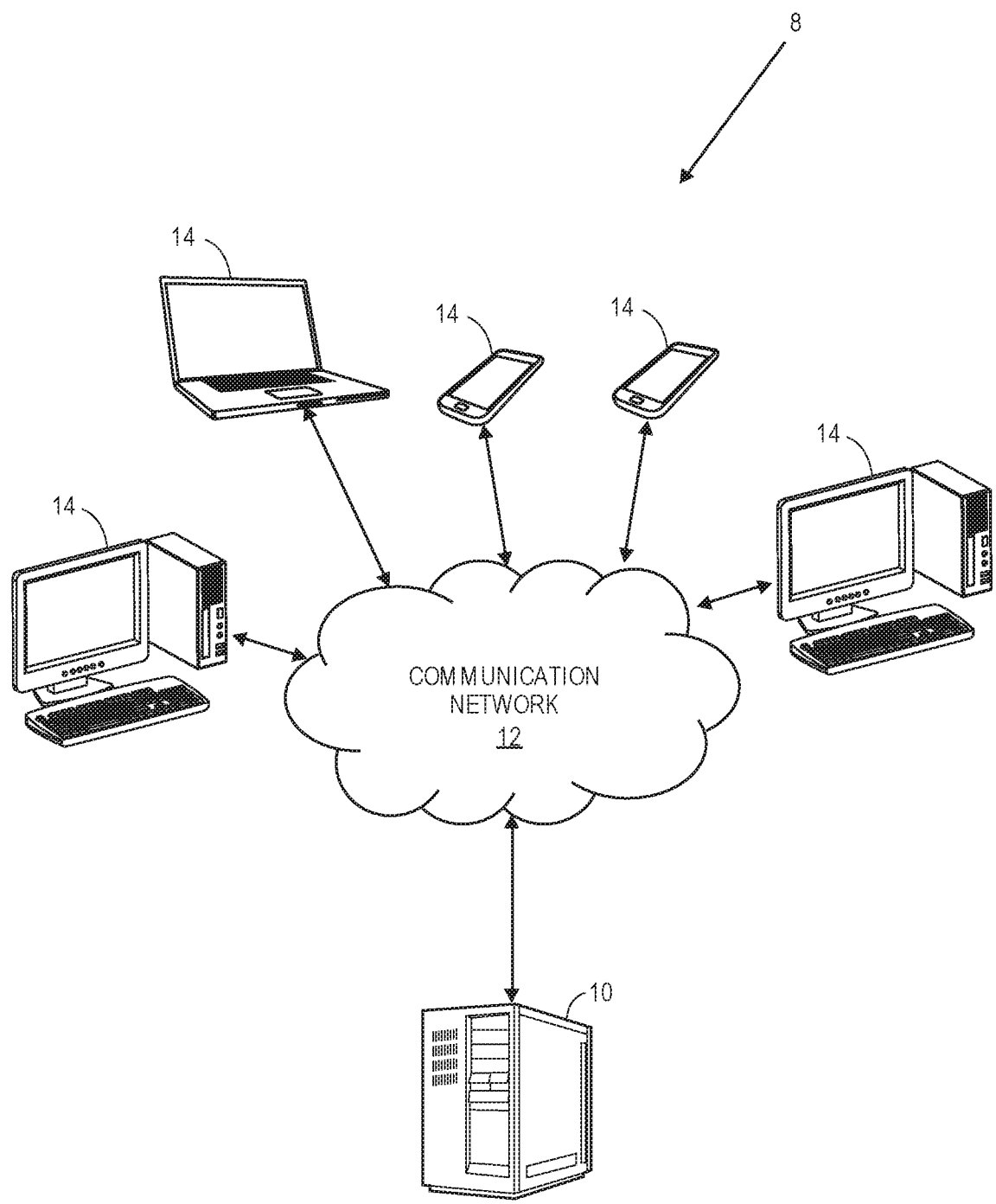
FIG. 1 illustrates an exemplary environment in which various embodiments of a computer server, configured for automated, dynamic capacity planning using HTTP header response fields, may operate, the exemplary environment including a communication network that allows communication with various computing devices.

Embodiments of the present technology relate to systems, computer-readable media and computer-implemented methods for automated, dynamic capacity planning using HTTP header response fields. Embodiments of the present technology provide an automated fast-acting complement to conventional (manual) capacity planning.

According to an embodiment, HTTP server software includes instructions to automatically determine a real-time (or near real-time) server workload statistic. The HTTP server software may, based at least in part on the statistic, automatically revise expiration values for HTTP header response fields corresponding to one or more resources and/or assets such as images, CSS files, JavaScript files, etc. (collectively referred to herein as "items") served by a web server.

For example, the HTTP server software may comprise a portion of an Apache™ HTTP Server or other known web server for responding to HTTP requests issued by client browser applications. As is known in the art, such a server may store a main configuration file, which may define default values and/or directives for how client browser applications should cache versions of requested items and/or under what circumstances the cached versions should be used in response to future requests for those items. Also or alternatively, the client browser applications may be pre-configured with one or more HTTP rules governing use of cached versions of items. Default values or directives relating to caching and stored in the main configuration file may generally be changed and otherwise managed by a system administrator, typically with global effect.

Exemplary HTTP server software may also include a special configuration file governing caching, typically in relation to a more limited scope of item(s). In the preferred embodiment of the present invention, the special file may comprise a .htaccess file placed within a web tree to govern use of items requested from the directory in which the file is placed and from all sub-directories.

According to embodiments of the present invention, the HTTP server software may include a series of instructions for: automatically determining a server workload statistic; calculating or determining, based at least in part on the server workload statistic, an expiration value governing use of a cached version of an item; and updating a configuration file of the HTTP server software to include the new expiration value, the configuration file being employed by the HTTP server software to populate at least one HTTP response header field with the new expiration value in response to future request(s) for the item.

In a preferred embodiment, the HTTP server software may enable a mod_status module or a similar piece of software for exposing server operation metrics. The HTTP server software may also include a custom module or the like including instructions for automatically extracting and/or parsing one or more workload statistic(s) from a page or file populated by the mod_status (or similar) module. The HTTP server software may also calculate a new expiration value comprising a cache-control value for the "max-age" variable (in seconds), and/or an expires header date/time, based at least in part on the workload statistic(s). For instance, where the statistic indicates a relatively high total number of incoming requests to the server(s) managed by the HTTP server software, the software may calculate a proportionate increase in a "max-age" expiration value, thereby automatically freeing up capacity to deal with the relatively high workload. The HTTP server software may also update one or more configuration file(s) (e.g., one or more .htaccess file(s)) with the new "max-age" expiration value. For example, the new "max-age" expiration value may be incorporated under a mod_expires module so that the HTTP server software may use the new expiration value in HTTP response headers for future requests for items corresponding to the one or more revised configuration file(s).

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary system 8 in which embodiments of a web server 10 may be utilized for automated, dynamic capacity planning using HTTP header response fields. The environment may include a communication network 12 and a plurality of client computing devices 14. Such client computing devices 14 may include a desktop computer, a laptop or tablet computer, a smartphone or similar devices configured to provide users access to the Internet via internet browser applications. The communication network 12 may provide wired and/or wireless communication between the client computing devices 14 and the web server 10. Web server 10 may serve requested content and items via Hypertext Transfer Protocol (HTTP) in response to requests made by users via the internet browser applications of the client computing devices 14.

Each of the client computing devices 14 may be configured to send data to and/or receive data from network 12 using one or more suitable communication protocols, which may be the same communication protocols or different communication protocols as one another. To provide an example, client computing devices 14 may be configured to communicate via a direct radio link, which may utilize, for example, a Wi-Fi direct protocol, an ad-hoc cellular communication protocol, etc.

The communication network 12 generally allows communication between the client computing devices 14 and the web server 10, such as via wireless communication and data transmission over one or more radio links. Network 12 may include one or more telecommunication networks, nodes, and/or links used to facilitate data exchanges between one or more devices, and may facilitate a connection to the Internet for devices configured to communicate with network 12. The communication network 12 may include local area networks, metro area networks, wide area networks, cloud networks, the Internet, cellular networks, plain old telephone service (POTS) networks, and the like, or combinations thereof.

The communication network 12 may be wired, wireless, or combinations thereof and may include components such as modems, gateways, switches, routers, hubs, access points, repeaters, towers, and the like. The client computing devices 14 and web server 10 may connect to the communication network 12 either through wires, such as electrical cables or fiber optic cables, or wirelessly, such as radio frequency (RF) communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof. In aspects in which network 12 facilitates a connection to the Internet, data communications may take place over the network 12 via one or more suitable Internet communication protocols. For example, network 12 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Figure 2:
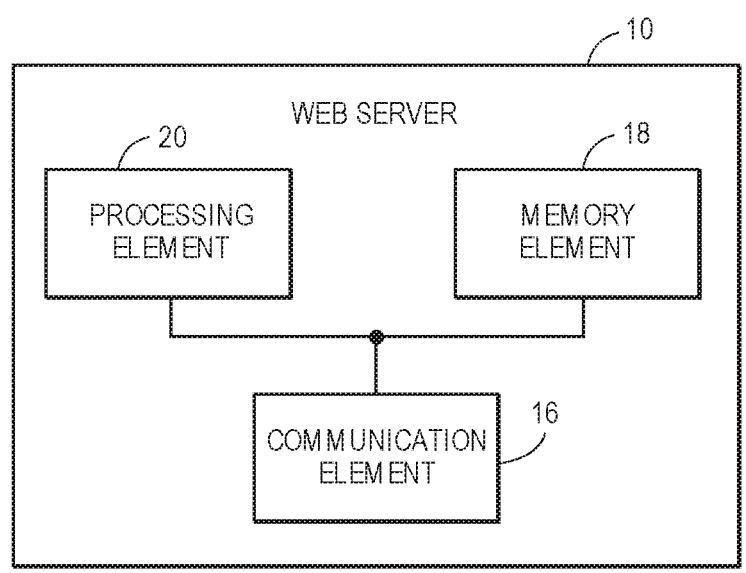
FIG. 2 illustrates various exemplary components of the computer server of FIG. 1, shown in block schematic form.

The web server 10 generally retains electronic data and may respond to requests to retrieve data, as well as to store data. The web server 10 may comprise and/or work in conjunction with application servers, database servers, file servers, gaming servers, mail servers, print servers, or the like, or combinations thereof. Furthermore, the web server 10 may include a plurality of servers, virtual servers, or combinations thereof. The web server 10 may be configured to include or execute software, such as file storage applications, database applications, email or messaging applications, web server applications, and/or the HTTP server software or the like. As indicated in FIG. 2, the web server 10 may broadly comprise a communication element 16, a memory element 18, and a processing element 20.

The communication element 16 generally allows communication with external systems or devices, including network 12, again such as via wireless communication and/or data transmission over one or more direct or indirect radio links between devices. The communication element 16 may include signal or data transmitting and receiving circuits, such as antennas, amplifiers, filters, mixers, oscillators, digital signal processors (DSPs), and the like. The communication element 16 may establish communication wirelessly by utilizing RF signals and/or data that comply with communication standards such as cellular 2G, 3G, or 4G, WiFi, WiMAX, Bluetooth™, and the like, or combinations thereof. In addition, the communication element 16 may utilize communication standards such as ANT, ANT+, Bluetooth™ low energy (BLE), the industrial, scientific, and medical (ISM) band at 2.4 gigahertz (GHz), or the like.

Alternatively, or in addition, the communication element 16 may establish communication through connectors or couplers that receive metal conductor wires or cables which are compatible with networking technologies, such as ethernet. In certain embodiments, the communication element 16 may also couple with optical fiber cables. The communication element 16 may be in communication with the processing element 20 and the memory element 18, again such as wireless communication and data transmission over one or more radio links.

The memory element 18 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 18 may be embedded in, or packaged in the same package as, the processing element 20. The memory element 18 may include, or may constitute, a "computer-readable medium." The memory element 18 may store the instructions, code, code segments, software, firmware, programs, applications, apps, modules, agents, services, daemons, or the like that are executed by the processing element 20, including the HTTP server software. The memory element 18 may also store settings, data, documents, sound files, photographs, movies, images, databases, and the like, including the items described throughout this disclosure.

The processing element 20 may include electronic hardware components such as processors. The processing element 20 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 20 may generally execute, process, or run instructions, code, code segments, software, firmware, programs, applications, apps, modules, agents, processes, services, daemons, or the like, including the HTTP server software described throughout this disclosure. The processing element 20 may also include hardware components such as finite-state machines, sequential and combinational logic, and other electronic circuits that can perform the functions necessary for the operation of the current invention. The processing element 20 may be in communication with the other electronic components through serial or parallel links that include address busses, data busses, control lines, and the like.

Through hardware, software, firmware, or combinations thereof, the processing element 20 may be configured or programmed to perform the following functions. The processing element 20 may execute the HTTP server software to serve an item in response to a request from a browser application of one of the client computing devices 14. For example, the processing element 20 may access the memory element 18, and may search an index and/or directory tree or the like for the requested item. One or more configuration file(s)—for example an .htaccess file—may be accessed in conjunction with the corresponding location within the index and/or directory tree that stores the requested item. The HTTP server software may read an expiration value from the configuration file and may incorporate the expiration value into a HTTP header response field as part of transmitting the requested item to the requesting client computing device 14. The browser application of the requesting client computing device 14 may save the received version of the item to a cache system of the client computing device 14 for future use. Exemplary caching systems include private and/or shared caches such as browser, proxy, gateway, CDN, reverse proxy caches and/or load balancers.

Where the expiration value comprises a "max-age" cache-control value (expressed in seconds), for example, the browser application may at least use the cached version of the item to satisfy future requests for the item if the future requests are received before expiration of the "max-age" value. As is known in the art, the browser application may also be enabled to use the cached version even after it becomes stale (i.e., after expiration of the "max-age" value), for example upon receiving a "304 Not Modified" response to a request including an ETag token in an "If-None-Match" HTTP request header. Similarly, where the expiration value comprises a date/time of an expires header field, the browser application may at least use the cached version of the item to satisfy future requests for the item if the future request is received before the date/time defined in the expires header field (and/or afterward in the manner described immediately above). One of ordinary skill will immediately appreciate that a variety of caching rules, heuristics and configurations may be employed by browser applications and/or the HTTP server software within the scope of the present invention.

According to embodiments of the present invention, the processing element 20 may, according to the HTTP server software instructions, periodically or continuously provide and/or expose a server workload statistic. In an embodiment, the HTTP server software may enable a mod_status module configured to populate an HTML page with the following real-time or near real-time server workload statistics: total number of incoming requests, total number of bytes and counts, central processing unit (CPU) usage, server load, server uptime, total traffic, total number of idle workers, etc. The HTTP server software may instruct the processing element 20 to periodically access the workload statistic (e.g., by automatically parsing the text content of the HTML page for the statistic), calculate a new expiration value based at least in part on the new expiration value, and save the new expiration value to a configuration file corresponding to an item.

In a more particular example, a single web server 10 may serve a single web page and its associated content (including a plurality of items), and an .htaccess configuration file may be associated with the web page within the memory element 18 of the web server 10. The .htaccess configuration file may define a default "max-age" cache-control value. The HTTP server software may include instructions causing the processing element 20 to: periodically access a workload statistic; determine a matching pre-defined range from among a plurality of pre-defined ranges; identify a new "max-age" cache-control value corresponding to the matched pre-defined range; access the .htaccess file to determine if the new "max-age" value matches a corresponding value parsed from the existing .htaccess file; and, if the values do not match, replace the accessed .htaccess file with a new version of the file incorporating the new "max-age" value.

As described in more detail below, one of ordinary skill will appreciate that a process for generating new expiration values may be executed continuously and/or on a rolling basis—and/or that new expiration values may be determined by an algorithm (rather than the simplified system of pre-defined range tiers described above) so that the corresponding .htaccess file(s) may be automatically updated each time the process is executed—without departing from the spirit of the present invention.

Exemplary Computer-Implemented Method

Figure 3:
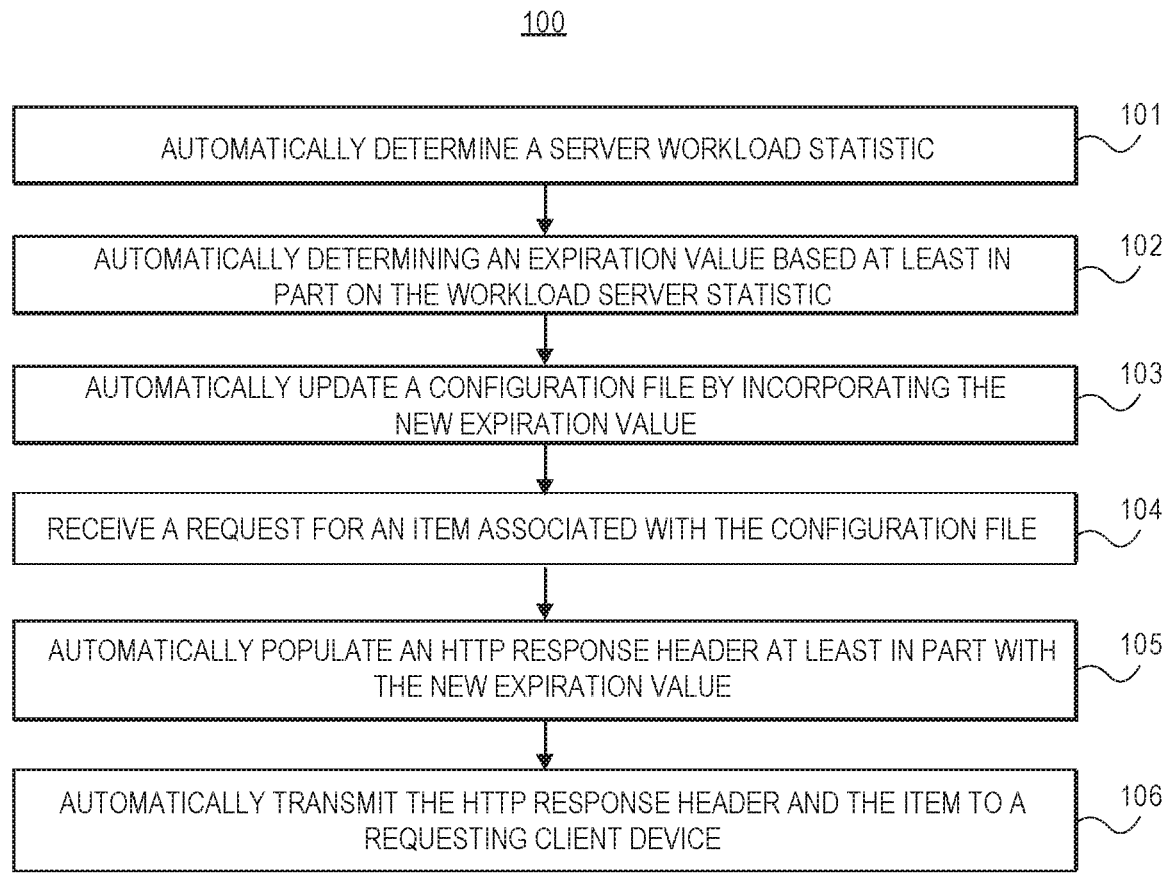
FIG. 3 illustrates at least a portion of the steps of an exemplary computer-implemented method for automated, dynamic capacity planning using HTTP header response fields.

FIG. 3 depicts a listing of steps of an exemplary computer-implemented method 100 for automated, dynamic capacity planning using HTTP header response fields. The steps may be performed in the order shown in FIG. 3, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-2. For example, the steps of the computer-implemented method 100 may be performed by the client computing devices 14, the web server 10 and the network 12 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. For example, the steps performed by the server(s) 10 may be performed in whole or in part by a load balancer of a web service system without departing from the spirit of the present invention.

One or more computer-readable medium(s) may also be provided. The computer-readable medium(s) may include one or more executable programs stored thereon, such as the HTTP server software, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a server workload statistic may be automatically determined. The statistic(s) may relate to workload at a single server or across multiple servers having overlapping responsibilities for serving requests by client computing device browser applications. A web service according to an embodiment may include a plurality of servers and supporting routers, load balancers and the like, with the statistic(s) relating to load on a plurality of such devices. The statistic(s) may relate to a volume and/or frequency of requests across one or more servers, total bytes served, present CPU usage for one or more of the servers, server load, or similar metrics.

Moreover, in an embodiment, an access log and/or monitoring tool may be employed to track more detailed statistics such as number of requests for specific items within a group of items (e.g., the group comprising items stored in a directory folder and sub-folders associated with a configuration file), the size and/or bandwidth required for transmission of specific item(s), and other details relating to items that may be disproportionately burdening the server(s) in question. For example, an access log may show that requests for a large .jpg file associated with a configuration file have spiked over the last twenty-four (24) hours, whereas requests for a small .pdf file also associated with the configuration file have remained low. It is foreseen that the statistic may be gathered at various levels of abstraction with respect to operation of the server(s) in question without departing from the spirit of the present invention.

Referring to step 102, an expiration value may be automatically calculated or otherwise determined based at least in part on the server workload statistic. In a simple embodiment, the statistic—for example, frequency of requests to a web server—may be matched against a plurality of pre-defined ranges or tiers. A first tier may be pre-defined between thirty (30) and fifty (50) requests per second (inclusive); a second tier may be pre-defined between fifty-one (51) and seventy (70) requests per second (inclusive), and so on and so forth. Each tier may be assigned an expiration value—for example, a "max-age" cache-control value, in seconds. An exemplary first tier expiration value may be 3600; an exemplary second tier value may be 18000, and so on and so forth. In this manner, the real-time or near real-time statistic may be matched to one of the plurality of pre-defined tiers in order to calculate or otherwise determine the assigned expiration value for the matched tier. Under the example, the statistic may comprise fifty-six (56) requests per second, and a new expiration value of 18000 may be determined for "max-age" cache-control. It is foreseen that the statistic may be matched against the tiers, and new expiration values may be calculated, on a continuous, rolling and/or periodic basis without departing from the spirit of the present invention.

In another embodiment, the expiration value may be automatically calculated, based at least in part on the server workload statistic, via mathematical equation. In a simple embodiment, the statistic and the expiration value may have a proportional relationship defined by the algorithm's equation. For example, number of requests per second (RPS) may be related to the "max-age" value in seconds (MAV) as follows: MAV=14400*RPS-10800 for all non-zero values of RPS and, where the statistic comprises a value for RPS that is less than one (1), the MAV may automatically revert to a baseline value of 3600.

One of ordinary skill will appreciate that other algorithmic relationships may be employed—for example taking into account exponential or other relationships between workload and system performance—within the scope of the present invention. One of ordinary skill will also appreciate that such algorithms may take into account multiple different server workload statistics in calculating one or more expiration values within the scope of the present invention. For example, an algorithm may be derived from observations of historical system performance data and/or of workload and/or system performance models exposing non-linear and/or proportional relationships between one or more of the variables. Generally, however, it will be understood that higher expiration values may be applied (selectively or broadly) in response to statistic(s) evidencing higher workload so as to automatically provide capacity planning for the server(s) based on real-time or near real-time workload data.

One of ordinary skill will appreciate that a statistic and corresponding expiration value may relate to multiple devices, servers and/or items without departing from the spirit of the present invention. One of ordinary skill will also appreciate that the statistic and corresponding expiration value may relate to more fine-grained details of workload and/or content—for example by referencing frequency of requests and/or "max-age" values for specific item(s)—within the scope of the present invention.

In another exemplary embodiment, an algorithm may define multiple mathematical relationships for determining expiration values, where the relationships are selectively employed dependent at least in part on the scenario evidenced by the statistic(s). In this manner, several different output values may be computed at step 102. For example, if workload is moderately higher than average according to the statistic(s), a large but non-critical item (e.g., a background .jpg file) may be prioritized for assignment of a correspondingly lengthened expiration value (e.g., a longer "max-age" cache-control value). However, if the workload is critically high (e.g., nearing capacity), expiration values for more critical items may be lengthened as well. In this manner, a first calculated expiration value (for the non-critical item) is used in a scenario involving a moderately increased workload, and a second calculated expiration value (for the more critical item(s)) may be used in a scenario involving a critically high workload. Alternatively, a single expiration value may be selectively applied to various items, dependent on scenario.

In a preferred embodiment, expiration values may be improved through reference to an item database. The item database may include a record or similar unique listing for each item individually and/or for each group or category of items. For instance, all image items may be grouped together in a single record, or broken out into individual images and/or sub-groups. In an embodiment, groupings may correspond to the categorization employed by an ExpiresByType or similar pre-defined module implemented by a server, for example where text, application, CSS, javascript, gif images, png images and similar file-type designations delineate groupings, with each grouping represented in a record of the item database.

Each record may include fields for one or more criticality measures (or "CMs") and one or more updating frequency measures (or "UFMs"). The algorithm(s) for calculating new expiration values may incorporate and/or reference these measures during processes for determining the new expiration values, as outlined in more detail below.

A criticality measure may comprise a numerical and/or qualitative representation of how important and/or frequently-used an item is. A criticality measure may be automatically derived from system data. For example, an item access log may be parsed periodically and/or continuously by server software to determine how often an item (or group of items) is accessed by client users. The number of accesses determined from the activity logs may be converted to a criticality measure. For example, ten thousand (10,000) accesses of an item in a day may be automatically converted to a numerical criticality measure of one (1) by server software (on a scale of one to ten (1-10)) or a qualitative criticality measure such as "high." On the other hand, five hundred (500) accesses of an item in a day may be converted to a numerical criticality measure of nine (9) or a qualitative criticality measure such as "low."

For another example, the numerical and/or qualitative criticality measures may be manually entered by one or more administrators—for example in view of a perceived business priority of the content owner—for use in the database. It is foreseen that automatically determined measures and manually-inputted measures may be combined or separately considered in connection with processes for determining expiration values. One of ordinary skill will appreciate that a variety of numerical and qualitative scales or hierarchies may be employed within the scope of the present invention.

Similarly, an updating frequency measure may comprise a numerical and/or qualitative representation of how frequently the item or group of items on aggregate is/are expected to be updated. An updating frequency measure may be automatically derived from system data. For example, an event log may be parsed periodically and/or continuously to determine how often an item (or group of items) is/are updated by system administrators or the like. The number of updates historically over certain periods of time—as determined from the event logs—may be converted to an updating frequency measure. For example, ten (10) updates of an item in a month may be converted to a numerical updating frequency measure of one (1) (on a scale of one to ten (1-10)) or a qualitative updating frequency measure such as "often." On the other hand, two-tenths (0.2) of an update for the item in a month (on average) may be converted to a numerical updating frequency measure of nine (9) or a qualitative updating frequency measure such as "rarely."

For another example, the numerical and/or qualitative updating frequency measures may be manually entered by one or more administrators—for example in view of a perceived need for updating by the content owner—for use in the database. It is foreseen that automatically determined measures and manually-inputted measures may be combined or separately considered in connection with processes for determining expiration values. One of ordinary skill will appreciate that a variety of numerical and qualitative scales or hierarchies may be employed within the scope of the present invention.

In a particular example, a first webpage of a website may be assigned a first configuration file (e.g., a first.htaccess file) and a second webpage of a website may be assigned a second configuration file (e.g., a second.htaccess file). Each of the first and second webpages is considered a monolithic "item" for purposes of the item database, meaning each represents all of its content in a single record of the item database. Server software automatically—either periodically or continuously—parses an access log and calculates a numerical criticality measure for each webpage based on historical traffic. For instance, the first webpage may be frequently-accessed according to a pre-defined scale relating to webpage accesses, and may be automatically assigned a criticality measure number of one (1) by the server software in a corresponding record of the item database. The second webpage may be infrequently-accessed according to the pre-defined scale, and may be automatically assigned a criticality measure of nine (9) in a corresponding record of the item database. Similarly, event logs may be parsed to automatically assign an anticipated updating frequency measure of one (1) to the frequently-updated first webpage, whereas the infrequently-updated second webpage may automatically be assigned an updating frequency measure of ten (10), respectively in the corresponding records of the item database.

Algorithms for calculating or otherwise determining expiration values may access the item database as part of determining the new expiration values. For example, applying lengthened expiration values may be prioritized for low criticality and updating frequency items, as automatically determined using the measures stored in the item database. The algorithms may also or alternatively incorporate the measures into calculations for new expiration values for the items represented in the item database. For example, the measures of a record in the item database may be considered together to calculate one or more coefficients for use in an equation for calculating a new expiration value for the items represented in that record. In the exemplary equation set out above, a revised equation taking into account values provided in the item database may read as follows: $MAV=CM*UFM*14400*RPS-10800$. As with the example above, the equation may be valid for all non-zero values of RPS and, where the statistic comprises a value for RPS that is less than one (1), the MAV may automatically revert to a baseline value of 3600.

Therefore, the exemplary equation would solve to its original form for the first webpage outlined above—having respective CM and UFM values of one (1). However, for the second webpage, the CM and UFM measures—again, used as coefficients in this example—would together multiply the quantity "14400*RPS" by ninety (90), causing a significant increase in the calculated expiration value for the second webpage.

One of ordinary skill will appreciate that various mathematical relationships (for example, exponentiation or the like) may be incorporated to magnify or lessen the impact of CM and UFM values on calculated expiration values within the scope of the present invention. More broadly, one of ordinary skill will appreciate that the item database, criticality and/or updating frequency measures, access logs, event logs, and other system data may be used in a variety of ways and according to a variety of algorithms within the scope of the present invention to determine new expiration value(s).

For example, in another preferred embodiment, the item database may store additional or alternative item metadata, such as item file size or average file size (for records corresponding to groupings of items). The file size measure may be automatically determined—for example, by referencing the file storage locations on the server that stores the item(s)—and stored with the record(s) corresponding to the item(s) in the item database. For instance, a numerical file size measure may be stored in each record, such as on a scale of one to ten (1-10) as outlined above. Also or alternatively, a qualitative measure may be specified, for example as chosen from the descriptors "large," "medium" and "small." New expiration value determination algorithm(s) may automatically reference the file size measure to prioritize application of lengthened (or shortened) expiration values. For example, the algorithm(s) may automatically read the file size measure for each item or item grouping in the item database, and may prioritize lengthening of expiration value(s) for large file size item(s) that are infrequently updated and not critical in view of heightened workload statistic(s). The algorithm(s) may also or alternatively incorporate numerical file size measure(s) into mathematical equations for determining new expiration value(s), substantially in accordance with the discussion above with respect to criticality and updating frequency measures.

Referring to step 103, a configuration file may be automatically updated by incorporating the new expiration value. Where a tiered system (outlined in more detail above) is used to determine a new expiration value, the configuration file may first be automatically parsed by server software to determine whether the new expiration value is the same as the present expiration value in the file. If they are the same, the configuration file may not be updated. If the new expiration value is different from the present expiration value in the file, an updated configuration file with the new expiration value may be automatically generated and saved for use serving future request for corresponding item(s). Where an algorithm is used that does not employ a tiered system to generate the new expiration value (for example, where an equation is used instead), an updated configuration file is preferably generated and saved each time a new expiration value is generated. However, where the server must be interrupted to update the configuration file (see discussion below), a difference between current and new expiration values may first be automatically calculated, and the new configuration file may only be generated and saved if the calculated difference is above a pre-defined threshold. This may serve to reduce the number of reboots or the like required to implement new expiration values that are not materially different from current expiration values of configuration files.

In a preferred embodiment (e.g., where a .htaccess configuration file is updated), no hardware and/or software reboot is required to update each configuration file with its corresponding new expiration value. However, it is foreseen that such a reboot and/or restart may be required in some embodiments. Preferably, where a reboot is required, the system includes a plurality of cooperative servers having overlapping responsibilities, so that one or a small subset of the servers may be rebooted at any given time, leaving the remaining servers active to handle incoming requests. One of ordinary skill will appreciate that there are a variety of known approaches for mitigating the affects of temporarily taking a server offline within a server cluster within the scope of the present invention.

Referring to step 104, a request for an item associated with the updated configuration file may be received from a browser application of a client device. Referring to step 105, an HTTP response header may be automatically populated at least in part with the new expiration value. For example, the updated configuration file may correspond to a directory folder and all sub-folders of the directory folder. When an item is requested by a browser application that the web server finds in one such sub-folder, the updated configuration file (and, therefore, the new expiration value) may be used to generate an HTTP response header containing the new expiration value. Referring to step 106, the HTTP response header and the requested corresponding item may be automatically transmitted to the requesting client device.

Advantageously, embodiments of the present invention enable an automated fast-acting complement to conventional (manual) capacity planning through automatically calculating and updating configuration files with expiration values for one or more HTTP header response fields. Embodiments of the present invention may provide improved website performance by automatically adjusting caching of items by client devices in response to perceived workload changes. Moreover, embodiments of the present invention provide automated mechanisms for selectively adjusting caching practices of client computing devices with reference to individual items or groupings of items, for example by referencing an item database automatically and continuously updated based at least in part on system event and access logs automatically populated by system server(s).

One of ordinary skill will appreciate that a number of operations may be required to configure HTTP server software according to embodiments of the present invention. For instance, write access may be provided to the configuration file(s) (e.g., .htaccess files) which are automatically updated with new expiration values. Also, the mod_expires or a similar module may need to be enabled for certain server types, and/or one or both of the ExpiresActive and AllowOverride directives or analogous counterparts thereof may enable use of cache-control/Expires headers and placement of authentication directives in .htaccess files, respectively. Further, HTTP server software may be configured to hook into normal server processes to ensure expiration value determination, configuration file updates and HTTP response header generation occur properly, for instance where the HTTP server software is hooked to run just after a content handler and output filters. Because the person of ordinary skill will immediately appreciate such supporting configurations upon review of this disclosure, elaboration thereon is not required.

The method 100 may include additional, less, or alternate actions, including those discussed elsewhere herein such as in the section entitled "Exemplary System," and/or may be implemented via a computer system, communication network, one or more processors or servers, and/or computer-executable instructions stored on non-transitory storage media or computer readable medium.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A system for automated, dynamic capacity planning using HTTP response header fields, said automated capacity planning system comprising:
   a memory device for storing data; and
   a processor communicatively coupled to said memory device, said processor programmed to:
      automatically determine a server workload statistic relating to operation of a server, the server being configured to serve a content item in response to HTTP-formatted requests and the server workload statistic reflecting an increased workload greater than a threshold;
      automatically determine a lengthened expiration value based at least in part on the workload server statistic;
      automatically determine that a difference between the lengthened expiration value and a current expiration value is greater than a pre-defined threshold;
      based on the determination that the difference is greater than the pre-defined threshold, automatically update a configuration file corresponding to the content item with the expiration value to increase the cached life of the content item, wherein the configuration file is selectively updated with the expiration value based at least in part on one or more of the following measures associated with the content item in a content item database: an updating frequency measure and a file size measure;
      receive a request for the content item from a requesting device;
      automatically access the configuration file and generate a HTTP-formatted response header incorporating the expiration value; and
      automatically transmit the HTTP-formatted response header and the content item in response to the request.

2. The system of claim 1, wherein the expiration value is measured in seconds and corresponds to a max-age cache-control general-header field of the configuration file.

3. The system of claim 1, wherein the expiration value comprises a date/time and corresponds to an Expires header field of the configuration file.

4. The system of claim 1, wherein determining a server workload statistic includes parsing a HTML document automatically populated with data exposed by a mod_status module.

5. The system of claim 1, wherein the server workload statistic reflects operation of a cluster comprising a plurality of servers including the server.

6. The system of claim 1, wherein automatically determining an expiration value includes matching the server workload statistic to a tier of a plurality of pre-defined tiers, the expiration value corresponding to the matched tier.

7. The system of claim 1, wherein automatically determining an expiration value includes executing an algorithm comprising a mathematical equation, the mathematical equation incorporating a variable replaced by the server workload statistic upon solving.

8. The system of claim 7, wherein the mathematical equation includes at least one other variable, the at least one other variable being replaced upon solving by a value for one or more of the updating frequency measure and the file size measure.

9. A computer-implemented method for automated, dynamic capacity planning using HTTP response header fields, the computer-implemented method comprising:
- automatically determining a server workload statistic relating to operation of a server, the server being configured to serve a content item in response to HTTP-formatted requests and the server workload statistic reflecting an increased workload greater than a threshold;
- automatically determining a lengthened expiration value based at least in part on the workload server statistic;
- automatically determining that a difference between the lengthened expiration value and a current expiration value is greater than a pre-defined threshold;
- based on the determination that the difference is greater than the pre-defined threshold, automatically updating a configuration file corresponding to the content item with the expiration value to increase the cached life of the content item, wherein the configuration file is selectively updated with the expiration value based at least in part on one or more of the following measures associated with the content item in a content item database: an updating frequency measure and a file size measure;
- receiving a request for the content item from a requesting device;
- automatically accessing the configuration file and generating a HTTP-formatted response header incorporating the expiration value; and
- automatically transmitting the HTTP-formatted response header and the content item in response to the request.

10. The computer-implemented method of claim 9, wherein the expiration value is measured in seconds and corresponds to a max-age cache-control general-header field of the configuration file.

11. The computer-implemented method of claim 9, wherein the expiration value comprises a date/time and corresponds to an Expires header field of the configuration file.

12. The computer-implemented method of claim 9, wherein determining a server workload statistic includes parsing a HTML document populated with data exposed by a mod_status module.

13. The computer-implemented method of claim 9, wherein the server workload statistic reflects operation of a cluster comprising a plurality of servers including the server.

14. The computer-implemented method of claim 9, wherein automatically determining an expiration value includes matching the server workload statistic to a tier of a plurality of pre-defined tiers, the expiration value corresponding to the matched tier.

15. The computer-implemented method of claim 9, wherein automatically determining an expiration value includes executing an algorithm comprising a mathematical equation, the mathematical equation incorporating a variable replaced upon solving by the server workload statistic.

16. The computer-implemented method of claim 15, wherein the mathematical equation includes at least one other variable, the at least one other variable being replaced upon solving by a value for one or more of the updating frequency measure and the file size measure.

* * * * *